United States Patent
Hölzl et al.

[11] 3,781,974
[45] Jan. 1, 1974

[54] WORKPIECE MANUFACTURING AND MACHINING DEVICE

[75] Inventors: Horst Hölzl, Ludwigsburg; Max Rosskopf, Marbach; Laszlo Csikor, Ludwigsburg, all of Germany

[73] Assignee: Karl Huller Gesellschaft mit beschrankter Haftung, Ludwigsburg, Germany

[22] Filed: Jan. 11, 1971

[21] Appl. No.: 105,569

[30] Foreign Application Priority Data
Jan. 10, 1970  Germany.................. P 20 00 998.7

[52] U.S. Cl..................................... 29/568, 29/563
[51] Int. Cl...................... B23q 3/157, B23q 41/02
[58] Field of Search................... 29/568, 26 A, 563, 29/33 P; 214/16.4 B

[56] References Cited
UNITED STATES PATENTS

| | | | |
|---|---|---|---|
| 3,576,540 | 4/1971 | Fair................................. | 29/568 X |
| 3,543,392 | 12/1970 | Perry et al........................ | 29/568 X |
| 3,587,873 | 6/1971 | Lohneis............................ | 29/568 X |
| 3,242,568 | 3/1966 | Flannery et al..................... | 29/568 |
| 3,536,209 | 10/1970 | Burch ............................... | 214/16.4 |

Primary Examiner—Andrew R. Juhasz
Assistant Examiner—B. R. Bilinsky
Attorney—Walter Becker

[57] ABSTRACT

An arrangement wherein a plurality of machine tools are arranged in a row with each machine tool having an spindle and a tool changing device on each side for inserting tools into the spindle or removing tools from the spindle. On each side of each machine tool is a tool storage element for cooperation with the tool changing devices and each having an endless tool supporting conveyor. The storage elements between adjacent machine tools can cooperate with the machine tool on each side thereof while all storage elements cooperate with a main storage element extending along the row of machine tools. Each machine tool also has a workpiece supply conveyor leading from the machine tool to a main workpiece conveyor and storage device adjacent the main tool storage element. The installation is under automatic control for the supply of tools to the machine tools and the movement of workpieces therebetween and for the exchange of tools between the machine tools and between the main tool storage element and the machine tools or the storage elements adjacent the machine tools.

24 Claims, 4 Drawing Figures

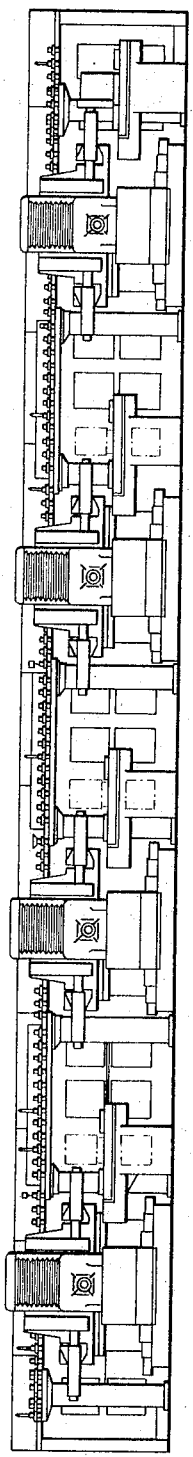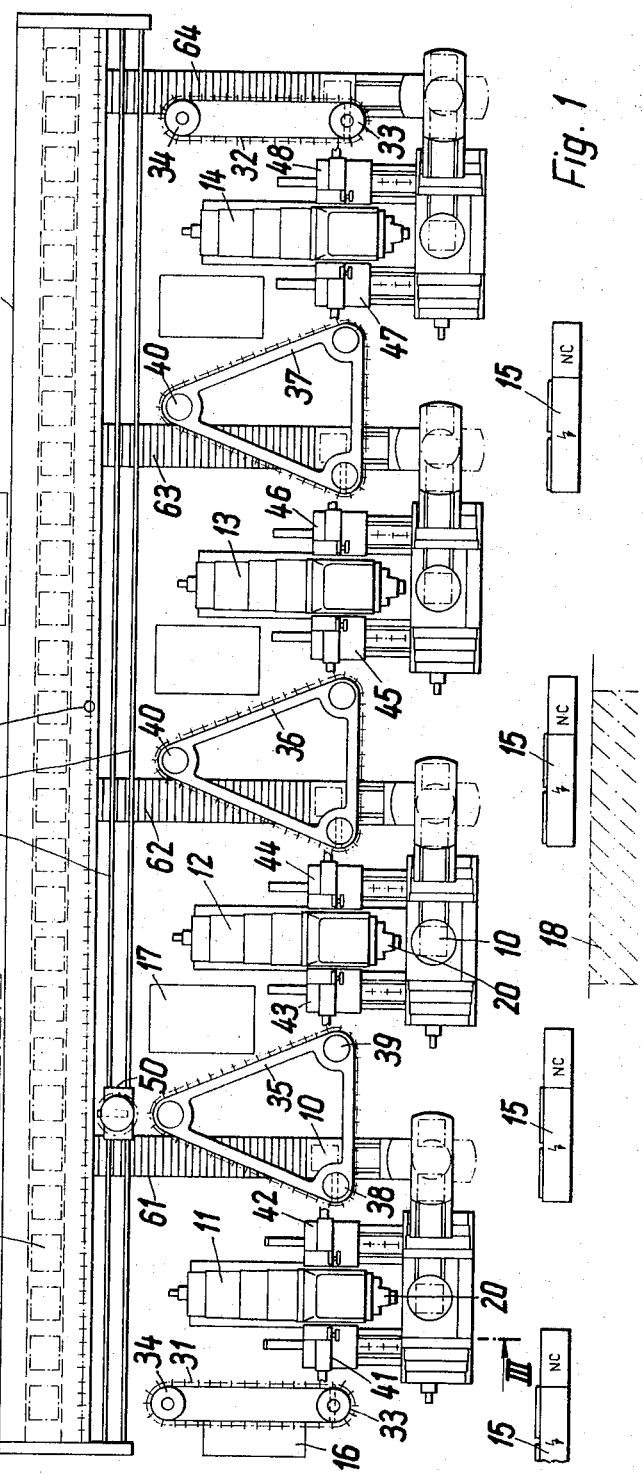
Fig. 1
Fig. 2

WORKPIECE MANUFACTURING AND MACHINING DEVICE

The present invention relates to a work piece processing device with a plurality of machine tools serving as machining stations and preferably controlled numerically. It is these machine tools to which the work piece is successively fed via a conveyor train.

It is known to interlink a plurality of numerically controlled machine tools in such a way that an automatic working and machining cycle will be effected. In this connection, a plurality of machine tools may be arranged relative to each other in such a way that the work piece is transported from one machine tool to the next machine tool while each machine tool has a perforated or punched tape which has been programmed by means of a calculator. In order to obtain an economic working cycle for the individual machine tools, these individual machines may additionally be controlled by a superimposed computer which controls the entire manufacturing system and keeps the individual machines controlled relative to each other. Heretofore known numerically controlled production devices of the type involved have, however, the drawback that the entire manufacturing process is disturbed when one of the machine tools which forms part of the chain of machine tools drops out or fails. Such stoppage of the entire installation in view of the stoppage of a single machine tool may result in an uneconomical operation of the entire installation.

It is, therefore, an object of the present invention to provide a work piece processing and providing system which will be able to continue operating even when a considerable percentage of the machine tools serving as machining stations should fail or drop out.

It is another object of the present invention to provide a device or arrangement as set forth in the preceding paragraph which will be able economically to produce in mass production not only large numbers of work pieces but will also offer the possibility of fully automatically and economically machining individual work pieces only.

For an economic production of small numbers of work pieces, it is, however, not sufficient merely that for the individual working operations there will be available a small number of from 10 or 20 tools. It is, therefore, a further object of the present invention so to provide arrangements of the type set forth in the two preceding paragraphs that above all with a numerically controlled working process for a great number of changing small series of work pieces, there will exist the possibility to make available a considerable number of tools, for instance 250 and in conformity with a program for a respective small series of work pieces to introduce these tools into the working spindles of the machine tools.

These and other objects and advantages of the invention will appear more clearly from the following specification in connection with the accompanying drawings, in which:

FIG. 1 illustrates a top view of a manufacturing system according to the present invention.

FIG. 2 shows a side view of the manfacturing system of FIG. 1.

Figure 3:
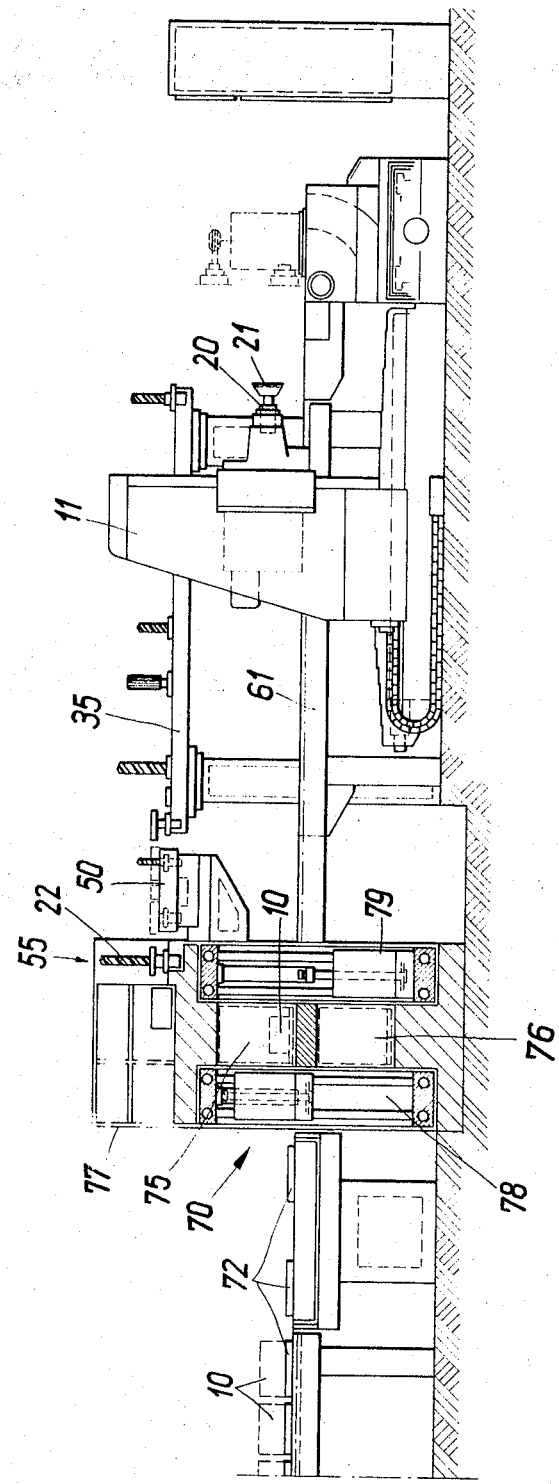
FIG. 3 is a section taken along the line III — III of FIG. 1.

The above outlined objects have been realized according to the present invention by providing that each of the machine tools has associated therewith an internal tool storage device which is preferably designed as a rotating transporting device. A particularly favorable arrangement is obtained when, in conformity with a further development of the invention, between each two adjacent machine tools there is arranged a common tool storage device in such a way that both machine tools have access to the common tool storage device. According to a preferred arrangement, the machine tools are arranged parallel and in spaced relationship to each other but at the same level with a plane which vertically crosses their tool spindles.

A particularly advantageous design of a manufacturing and machining device is obtained if in conformity with a further development of the invention, each machine tool comprises two tool grasping devices which are operable independently of each other by remote control and are arranged on one each of the two machine sides between the machine and one of the tool storage devices. In this instance, it can without difficulty be assured that with a greater number of machine tools on both sides of each machine tool there is arranged one each of two internal tool storage means and that each individual machine tool will have access through its two tool grasping devices to said two tool storage devices. In this way, the number of the tools to which each individual machine tool will have access can be doubled. A particularly favorable arrangement will be obtained when the individual machine tools are arranged between two tool storage means, which means if with regard to a number n of machine tools the number of tool storage means amounts to $n + 1$. The tool storage means designed as transporting devices may have the form of chains or of turrets. It has proved particularly advantageous to design the two tool storage means in the form of endless transporting belts or chains having two reversing zones. If only two reversing zones are provided, the sections of the transporting belts or chains located between the two reversing zones are approximately parallel to the axis of rotation of the tool spindle of the machine tool. It is these tool storage means into which are advantageously inserted those tools which with the intended working and machining programs will be used continuously or at least frequently. However, in order to be able to also introduce into the machining system less frequently used tools or tools required in individual special working programs only, it is, according to a further suggestion of the present invention, proposed that always one of the reversing zones of the transporting belts or transporting chains is arranged in the vicinity of a tool-receiving-large magazine from which these less frequently employed tools can be withdrawn. This large or giant magazine may in addition thereto be able to place into readiness replacement pieces for the more frequently used tools which can easily be exchanged for damaged tools. Transporting belts or chains provided with two reversing zones and moving substantially parallel with regard to the axis of rotation of the machine tool, are preferably arranged where they are exposed only to the access from a single machine tool and the tool grasping device pertaining thereto, namely on the outside of a row comprising a plurality of machine tools. In contrast thereto, for the common tool storage means arranged between two machine tools it is provided that they comprise three reversing zones which form the corners of a preferably isosceles triangle, one of the corners preferably being located in the vicinity of the tool-receiving giant magazine, whereas the other two corners are located in the vicinity of one of the tool-grasping devices each of the two machine tools.

When a plurality of tool storage means are provided which serve as circulating transporting devices, the number of the tools already prevailing may be further increased considerably by providing that according to a further suggestion of the invention, there is provided a tool-transporting carriage which stops in the vicinity of all of the reversing zones of the tool carriage means which are located in the vicinity of the tool-receiving giant magazine. The path of said tool-transporting carriage is at least approximately parallel to the longitudinal direction of the giant magazine and/or extends perpendicularly with regard to the axes of rotation of the tool spindles of the machine tools. Such an arrangement offers the possibility that the tool-transporting carriage can move along the giant magazine and, more specifically, along its longitudinal direction and can pick up the there stored tools in conformity with the requirement and can receive the tools in the sequence controlled by the computer, and as the case may be, can be exchanged for other tools. In order to reduce the number of trips and to reduce the driving paths, it is possible expediently on the tool transport carriage to provide a greater number of receiving means, preferably of at least five receiving means for exchangeable tools.

In conformity with the present invention, it is further provided that records arranged stationarily in the tool-receiving giant magazine are provided for the tools there to be arranged. In this way, it will be possible without risking the danger of injuries which occur infrequently with the heretofore known circulating magazines to manually withdraw individual tools from the magazine and to replace the same manually by other tools.

According to a further suggestion of the invention, it is provided with a plurality of adjacent machine tools of which each is equipped with two tool-grasping devices, so to design the two tool-grasping devices arranged between two adjacent machine tools of which one each pertains to another one of the two machine tools, that a transfer of one tool from one machine tool will be possible to the adjacent machine tool.

Whereas the heretofore suggestions are directed to place into readiness as great a number of tools for each of the machine tools and, to simplify exchangeability of the tools from machine to machine, the now following suggestions in conformity with the invention concerns above all the transport of the work pieces to be machined and also concern the manual exchangeability of the individual machining operations on the machine tools which can take the place of each other. To this end, it has been suggested in accordance with a further development of the invention, that at least two of the machine tools, preferably, however, all machine tools, will have identical tool-receiving means. It is particularly advantageous in this connection if of the machine tools at least two, preferably, however, all of them, are designed as universal machine tools. According to a further suggestion of the invention, it is provided that each machine tool has a remote control work piece exchanging unit. Advantageously, each work piece exchanging unit is provided with two receiving stations rotatable or pivotable relative to each other by 180°, for each supporting plate with a work piece which is to be fastened on the carrier plate and to be machined.

The intended easy by-pass of a machine tool which has become defective and the maintaining of a machining program which incidentally has not been disturbed, may, according to a further important feature of the invention, be realized by associating one of a plurality of work piece conveying belts for each machine tool. By means of these work piece conveying belts, the work pieces to be machined are conveyed to the machine tools, preferably individually from an intermediate storage means, and after the machining process are conveyed into the intermediate storage means. Such intermediate storage means may advantageously be designed stationarily and may simultaneously serve to store the work pieces prepared for machining, including their carrier plates until they are introduced into the machining process. Expediently, the conveyor belts may at least approximately be parallel to the axes of the tool spindle of the respective machine tool. Advantageously, all of the conveyor belts are at least approximately parallel to each other.

According to a further development of the invention, it is provided that the conveyor belts are arranged perpendicularly with regard to the longitudinal side of the intermediate storage means the length of the intermediate storage means may be selected so large that all conveyor belts can be distributed over the length of the intermediate storage means, preferably at equal distances. In order to increase the receiving capacity of the intermediate storage means, the latter may have at least three stories. For withdrawing the work pieces from the intermediate storage means and for transferring the work pieces to the respective machining station or machine tool, there are provided conveyor belts according to which in conformity with a further development of the invention there is at least along one longitudinal side of the intermediate storage means provided a work piece transport carriage which is displaceable in the longitudinal direction of said intermediate storage means. The said transport carriage is with a multi-stage design of the intermediate storage means displaceable in longitudinal direction as well as in vertical direction.

In order to be able to enlarge the manufacturing device sectionwise so that it will have a higher capacity, it is furthermore suggested according to the invention that the manufacturing and machining device may be composed of a plurality of building groups each of which comprises a machine tool, at least one tool-grasping device, at least an internal tool storage means, a work piece changing device, and a work piece conveying belt.

Referring now to the drawings in detail, the manufacturing and processing device illustrated therein comprises four machine tools 11, 12, 13 and 14 which serve as machining stations and preferably are identical, universal machines. Each of these machine tools has associated therewith one of four numerically controlled devices 15 which in conformity with machining programs stored therein are adapted through the intervention of hydraulic control devices 16, 17 to act upon the individual machining stations and the auxiliary devices pertaining thereto which will be described further below. The numerical control devices 15 are in their turn checked by a central computer 18 and if necessary also controlled. Depending on the type of the tool inserted into the rotating working spindle 20, the individual machine tools 11-14 may carry out different machining operations such as drilling, milling, etc. According to the specific example shown in FIG. 3, a miller or cutter 21 has been inserted into the machine tool 11.

In order to be able for the frequently repeated machining operations requiring different tools to keep in readiness the necessary basic tools in the necessary number and with sufficiently short feeding strokes and feeding times, each of the machine tools 11-14 has in conformity with the basic principle of the invention associated therewith at least one internal tool storage means designed as circulating transporting device. According to the specific embodiment of the invention as illustrated, the two tool storage means 31, 32 are arranged on the outside of the machine tool series. These tool storage means 31, 32 comprise in an endless chain (indicated merely by dash lines) 38 receiving means (not illustrated in detail) for each of the outer machine tools 11 and 14. These endless chains of the two tool storage means 31 and 32 are guided via two reversing stations namely a front reversing station 33 in the vicinity of the tool spindle 20 of the pertaining machine tool, and a rearward reversing station 34 parallel to the longitudinal axis of its pertaining machine tool. In the interior of the machine tool series, there are provided three tool storage means 35, 36 and 37 which serve as circulating endless transporting devices. These tool storage means are respectively located in the space between two machine tools 11-14 and each of which comprises two front reversing stations 38 and 39 in the vicinity of the tool spindles 20 and a rearward reversing station 40. These reversing stations are arranged at the corners of an isoceles the line of height of which extends through the rearward reversing station 40 and the axis of symmetry of which is parallel to the axes of the machine tools. In order to make sure that each of the machine tools can be supplied from two directly adjacent tool storage means with the necessary tools, on each of the two sides of the machine tool 11 there are provided two gripping devices 41 and 42 forming an image to each other and operable hydraulically by the pertaining numerical control device 15. Furthermore, on both sides of the machine tool 12 there are provided one of two tool gripping devices 43 and 44 while on the machine tool 13 there is provided one of two gripping devices 45, 46 each while on the fourth machine tool 14 there are provided two gripping devices 47 and 48 each of which has access to one of the tool storage means 31, 32 and 35-37. Each of the three inner internal triangularly designed tool storage means 35, 36 and 37 is adapted to receive approximately fifty basic tools so that a total of approximately two hundred twenty basic tools can be kept in readiness by the tool storage means 31 and 32 and 35-37. These basic tools are adapted in view of the fact that on both sides two gripping devices each 41,42; 43,44; 45,46; and 47,48 can be exchanged from tool storage to tool storage. Such an exchange may additionally be effected by the tool transport carriage 50 when moved to the rearward reversing stations 34 and 40 of the tool storage means. The tool carriage 50 has associated therewith a path 51, 52 which extends over all of the tool storage means and is arranged transverse to the axes of the machine tools.

By means of the carriage 50, it is possible to move approximately fifty individual tools which have become defective or have to be post-ground, from the storage means 31 and 32 as well as from 35 to 37 into a giant tool magazine 55 provided with the corresponding space for receiving the tools. This giant tool magazine furthermore may keep in readiness a great number of special tools which by means of the tool transporting carriage can be moved into those tool storage means and to those machine tools where they are required. The giant tool magazine extends parallel to the transporting path 51, 52 of the carriage 50 and may advantageously be designed in the illustrated manner as shelf means. It thus receives all those basic and special tools which may be required in connection with one of the many process machining operations programmed in the numeral control device 15.

If for instance for a certain machining operation required on one of the work pieces which may be different from each other, a tap drill 22 is required, this tap drill will be located at a point of the giant magazine 55 which is provided in the stored program and to which point the tool transport carriage 50 may be directed by one of the numerical control devices 15 or computer 18 and where the necessary special tool can be withdrawn. In order to make sure that the carriage 50 does not have to be actuated because of a single special tool, said carriage 50 has a greater number of receiving means for such tools (in the illustrated embodiment ten) and will be able in view of the numerical insert in the cycle, to pick those tools from the giant tool magazine which said carriage has to supply soon and brings the same to the provided machining station. On the other hand, said carriage withdraws from the tool storage means 31, 32; 35-37 those tools which are no longer necessary and places the same into the giant tool magazine 55. The tool transport carriage 50 thus connects the giant tool magazine 55 with the individual machining stations. The advantage of this arrangement will easily be evident from the following.

It may be assumed that one of the machine tools drops out in view of some failure. While in such an instance the overall output of the machining device drops, this disorder may be taken into consideration by so-called "disorder programs" in the numerical control device and in the computer, and shifts the operations which were to be carried out on the failing machine to the remaining machine tools. This makes it necessary that also the corresponding tools be shifted for use on the other machines so that the failing machine tool can be disengaged from the rest of the series. This shifting of the tools from the failing machine to the other machine tools is carried out by means of the tool transport carriage 50 which automatically moves these tools to one of the other machines. In view of this exchange operation of the tools, it will be possible in case of a failure of a machine to maintain the remaining machines of the machining device in operation and to obtain an output which while less than the normal output still represents an optimum output without the necessity of stopping the entire series. The failing machine can easily be disengaged and repaired. Later, the repaired machine tool can be again added to the remaining machines of the series and will be active again after the tools have been introduced.

For purposes of further increasing the safety of operation and to reduce the liability of failure, it is provided according to the present invention that the work pieces to be machined are fed to the individual machines not in an automatic circulation which is liable to disorders, but individually and so that it can be interrupted at any desired time. To this end, it is provided that each of the machine tools 11–14 has associated therewith its own conveyor belt namely one of the conveyor belts 61–64. On these conveyor belts, the work pieces (one illustrated at 60) may be withdrawn from a work piece storage means 70 for purposes of being machined on the respective machine tool and after completion of this machining operation may be again returned to the work piece storage means 70.

Figure 4:
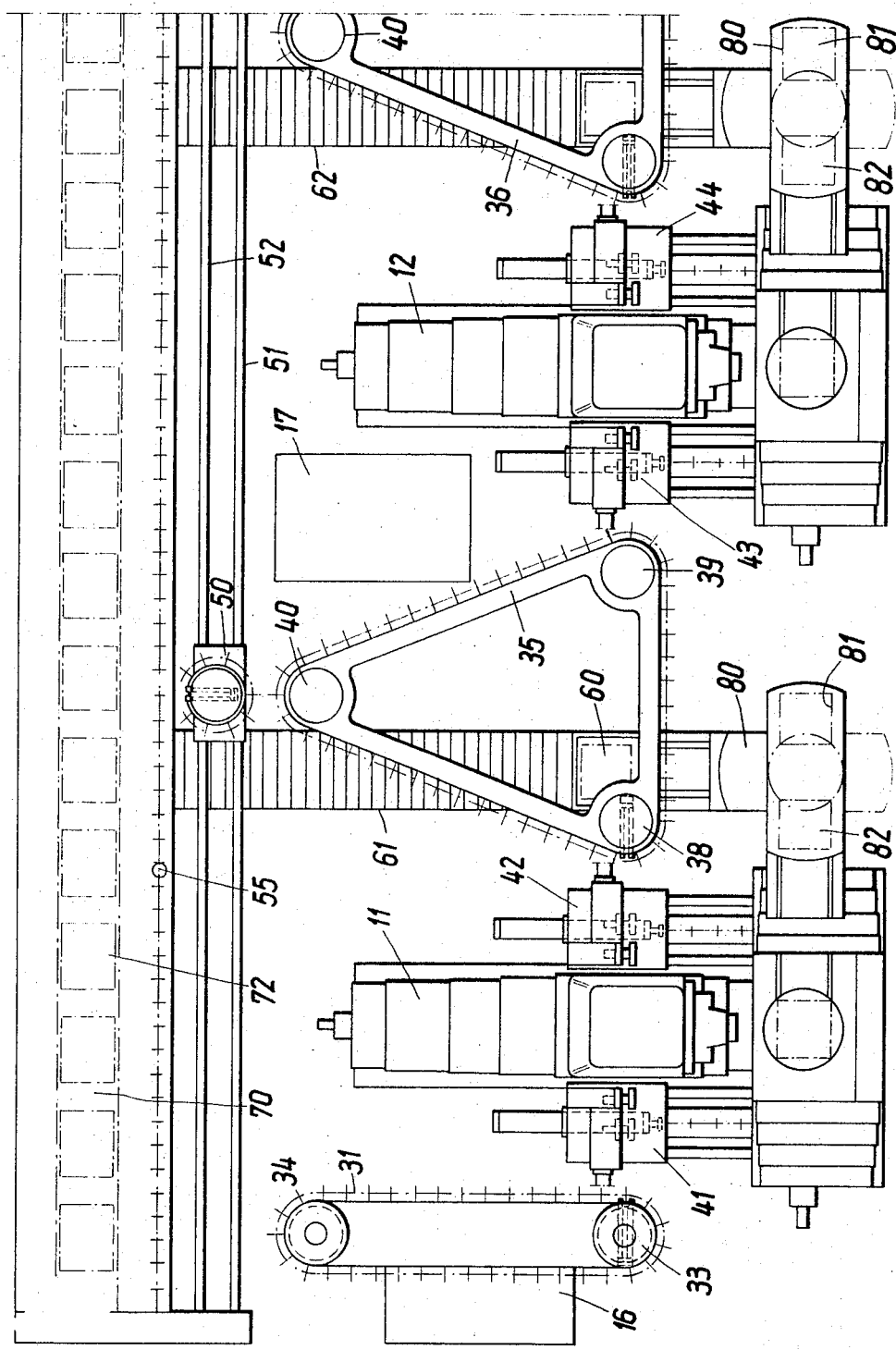
FIG. 4 shows on a somewhat larger scale than FIG. 1 approximately half of the left-hand side of FIG. 1.

In order to reduce the space requirement for the work piece storage means 70 to a minimum, the latter is in the form of a structural shelf unit with the giant magazine 55 as is clearly indicated in FIG. 3. On that side of the storage means 70 which faces away from the machine tools, there is provided a loading station 71 where the work pieces 10 intended for machining are connected to support 72 forming work piece carriers and then together with the latter may be introduced into the storage means 70. On the same side of the storage means but in spaced relationship to the loading station 71, there is provided a discharging station 73 where the work pieces following their machining may be withdrawn from the supports 72. The work piece storage means 70 is sub-divided into two stories namely an upper storage story 75 and a lower storage story 76. Each of these stories will, as will be evident from FIGS. 1 and 4, offer space for a number of supports and as the case may be, for work pieces connected thereto, inasmuch as the storage means 70 as well as the tool giant magazine 55 and the moving path of the carriage 50 extend so far that it covers all of the machine tools, the tool storage means thereof and the individual conveyor belt 61–64. The work pieces which in a loading station 71 are connected to a support 72 may from there be inserted into one of the stories which are open at the back side 77 facing away from the machine tool and are therefore freely accessible. In a manner known per se, a signal may be transmitted to one of the numerical control devices 15 or the computer 18 to indicate where the individual work piece has to be unloaded in the storage means.

According to the illustrated embodiment, two work piece transporting devices 78 and 79 are provided which are movable independently of each other. Of these devices 78 and 79, the device 78 serves for introducing and withdrawing the work piece into and out of the storage means 70. The other transporting device 79 serves for withdrawing the stored work pieces from their storage position and to feed them to the individual work piece conveyor belt 61–64. Both work piece transporting devices 78 and 79 may move in the longitudinal direction of the storage means 70 parallel to the path 51, 52 of the carriage 50 and may also move upwardly and downwardly for serving the two storing stories.

The above described design of the work piece manufacturing and processing device has, over heretofore known devices of the type involved, the great advantage that the storing position for the tools and work pieces permit an easy watching and checking, and that the devices for transporting the work pieces and tools leave a sufficiently large and easily checkable free space of movement around the machine tool whereby it will be possible in case of damage to disengage an individual machine without affecting the machining process of the other machines and if necessary again to insert the failing and repaired machine. A further important advantage of the device according to the invention is seen in the fact that the work pieces can be individually withdrawn from the storage places and can individually be brought to the conveyor belt of that machine tool which has been programmed also for the intended machining operation.

By means of the respective conveyor belt, the work piece is then moved to one of the four identical work piece changing devices 80 each of which is arranged on one of the four machine tools in the vicinity of the tool spindle thereof. Each of these work piece exchange units 80 has two receiving stations 81 and 82 for one each of the supports 72 provided with a work piece. Advantageously, the work piece exchange unit 80 is so designed that it forms a pivotable table while a new work piece to be machined is moved or inserted into one of the two work piece receiving means 81 and 82 when the work piece located in the other work piece receiving means is being machined by the machine tool. When the machining process has been completed, a work manipulator (not shown in the drawing) withdraws the work piece from its machining position and pivots the work piece exchanging device by 180° and brings the next not yet machined work piece into machining position. In this way, it will be easily possible to reduce dead periods to a minimum. An important feature of the machining device according to the invention consists in that the finish machined work piece can principally be returned to the work piece storage means 70, and more specifically, through a conveyor belt 61–64 which is reversible as to its direction of movement. Another advantage consists in that the work piece is deposited in the storage means 70 before it is withdrawn for machining in one of the next machine tools. When the work piece deposited in the storage means is to be machined further, it will again be withdrawn by one of the numerical control devices 15 or directly by the computer 18 and by means of the work piece transporting device 79 will be moved to that one of the conveyor belts 61–64 on which the work piece can be fed to the intended machine tool, In view of the design according to the invention, it is possible to maintain an uninterrupted operation of the machining device even though a machine may fail or if individual machines of the respective series have to be reset. The required servicing and operation merely consists in chucking the individual work pieces to a support or to remove the work pieces therefrom the by effecting a control operation for the post-grinding or the replacement of damaged tools. In this connection, it is possible without difficulties to check the tools if they are not chucked into a machine tool and to carry out this checking automatically. It is expedient to keep in readiness all those basic tools which are used more frequently and to keep these tools in readiness in a double number namely once in the tool storage means and once in the giant tool magazine 55.

It is, of course, to be understood that the present invention is, by no means, limited to the particular showing in the drawings but also comprises any modifications within the scope of the appended claims.

What is claimed is:

1. In an arrangement for processing workpieces; a plurality of machine tools arranged in a row, conveyor means to move workpieces successively to said machine tools for being processed therein, and tool storage means associated with said machines for the storage of tools therein, said tool storage means and machine tools including means for the automatic transfer of tools therebetween, said tool storage means comprising at least one endless circulating tool transport means adjacent each said machine tool, each tool transport means having at least two reversing zones, one of said reversing zones being located adjacent the respective machine tool for the transfer of tools therebetween, a main tool storage device extending along all of said machine tools, and the other of said reversing zones being located adjacent said main tool storage device, said endless circulating tool transport means including an internal tool storage means located between each adjacent pair of machines, each internal storage means comprising a circulating endless member having three reversing zones, one of said reversing zones being adjacent said main tool storage device and each of the others being adjacent a respective one of the adjacent said machine tools for the exchange of tools therewith.

2. An arrangement according to claim 1 in which said machine tools are arranged in spaced relation and said internal tool storage means is arranged between each adjacent pair of said machine tools, so that both of the machine tools adjacent thereto have direct access to the tools therein.

3. An arrangement according to claim 2 in which each of the said machine tools includes two tool transfer devices operable independently of each other and located on opposite sides of the respective machine tool and adapted for cooperating with an adjacent internal tool storage means.

4. An arrangement according to claim 2 in which each of the said machine tools at the ends of said row has associated therewith an endless circulating tool storage means on the opposite side thereof from the next adjacent machine tool.

5. An arrangement according to claim 1 in which said main tool storage device comprises tool transporting carriage means guided for movement in a direction generally parallel to the main tool storage device and a plurality of receiving means for tools, said main storage device including stationary receiving means for the manual insertion and removal of tools.

6. An arrangement according to claim 1 in which each said machine tool has tool transfer devices on the opposite sides thereof and operable for transferring tools from one machine tool via said tool storage means to the next adjacent machine tool.

7. An arrangement according to claim 1 in which each of said machine tools has at least two tool transfer devices of the same design to permit the exchange of tools between the machine tools, and in which at least two of said machine tools are substantially identical with each other.

8. An arrangement according to claim 1 in which each said machine tool includes a workpiece receiving unit, each said unit having at least two receiving stations for receiving workpieces, said unit furthermore being moveable for selectively presenting workpieces thereon to working position in the respective machine tool.

9. An arrangement according to claim 1 which includes workpiece conveying means for each said machine tool and workpiece storage means common to all of said machine tools, said workpiece conveying means leading from said workpiece storage means to the respective machine tool.

10. An arrangement according to claim 9 in which said workpiece conveying means are in the form of conveyor belts, each machine tool having a tool spindle and the belts extending parallel to the spindles of the respective machine tools, said workpiece storage means extending substantially parallel to said row of machine tools and perpendicular to said conveyor belts.

11. An arrangement according to claim 10 in which said workpiece storage means has at least two sides and upper and lower levels and includes a transporting carriage on at least one side, said carriage being moveable in the longitudinal direction of said workpiece storage means and also in the vertical direction between the upper and lower levels of said workpiece storage means.

12. An arrangement according to claim 11 in which the main tool storage device extends parallel to said workpiece storage means and adjacent thereto, said main tool storage device and said workpiece storage means being combined as a structural unit.

13. In an arrangement for processing workpieces; a plurality of machine tools, tool storage means associated with said machine tools for the storage of tools therein, said tool storage means and machine tools including means for the automatic transfer of tools therebetween, said tool storage means including internal tool storage means and further including a main tool storage means for all machine tools, a tool changer means associated with each machine tool and operative to supply selectively tools from said internal tool storage means to its particular machine tool at a time, a tool carriage to transfer tools between said main tool storage means and said internal tool storage means, said internal tool storage means lying between adjacent machine tools and being accessible to said tool changer means of both of these machine tools so that each of said tool changer means can effect a direct tool interchange between its associated machine tool and said internal tool storage means.

14. In an arrangement for processing workpieces; a plurality of machine tools numerically controlled, tool storage means associated with said machine tools including a plurality of internal tool storage means and a main tool storage means extending along all said machine tools, tool changer means operative to supply selectively tools from each internal tool storage means to a machine tool, said tool storage means including a tool transferring means connecting said internal tool storage means to said main tool storage means for transfer of tools between said main tool storage means and any one of said internal tool storage means, each of said internal tool storage means comprising an endless conveyor tool transport means adjacent each machine tool, certain of said endless conveyor tool transport means lying between said tool changer means of adjacent machine tools to directly interchange tools between said certain conveyor means and their adjacent machine tools, each tool transport means having at least two reversing zones, one of said reversing zones being located adjacent a respective machine tool for the transfer of tools therebetween, and another of said reversing zones of each tool transport means being located adjacent said main tool storage means.

15. An arrangement according to claim 14, in which there are three reversing zones for the endless conveyor of the internal tool storage means, said three reversing zones lying at corners of a substantially equidistant triangular configuration.

16. An arrangement according to claim 14 in which said tool transferring means includes a transporting rail path extending along the internal tool storage means and stationary magazine included with said main tool storage means, said stationary magazine providing tool receiving locations for the tools manually insertable and removable from said main tool storage means.

17. An arrangement according to claim 16 in which said main tool storage means and said rail path of said tool transferring means lie parallel to each other and have substantially the same length.

18. An arrangement according to claim 17 in which said tool transferring means lies between said main tool storage means and said internal tool storage means.

19. An arrangement according to claim 14 in which adjacent machine tools have respectively identical tool receiving locations relative to each other.

20. An arrangement according to claim 14 in which workpiece conveying means for each said machine tool are provided and workpiece storage means common to all of said machine tools, said workpiece conveying means leading from said workpiece storage means to the respective machine tool.

21. An arrangement according to claim 20, in which said workpiece conveying means are at least substantially parallel to axes of tool spindles of the machine tools.

22. An arrangement according to claim 21 in which said workpiece conveying means are arranged at right angles to a longitudinal side of said workpiece storage means.

23. An arrangement according to claim 22 in which work piece transporting carriage means are provided to move in longitudinal direction of the longitudinal side of said work piece storage means.

24. An arrangement according to claim 23 in which said workpiece storage means has at least two levels and said work piece transporting carriage is movable at such levels.

* * * * *